(12) United States Patent
Srinivasan et al.

(10) Patent No.: US 10,922,895 B2
(45) Date of Patent: Feb. 16, 2021

(54) PROJECTION OF CONTENT LIBRARIES IN THREE-DIMENSIONAL ENVIRONMENT

(71) Applicant: Microsoft Technology Licensing, LLC, Redmond, WA (US)

(72) Inventors: Vidya Srinivasan, Issaquah, WA (US); Colton Brett Marshall, Seattle, WA (US); Harold Anthony Martinez Molina, Seattle, WA (US); Aniket Handa, Seattle, WA (US); Amy Scarfone, Seattle, WA (US); Justin Chung-Ting Lam, Bellevue, WA (US); Edward Boyle Averett, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 42 days.

(21) Appl. No.: 15/971,237

(22) Filed: May 4, 2018

(65) Prior Publication Data
US 2019/0340830 A1 Nov. 7, 2019

(51) Int. Cl.
G06T 19/20 (2011.01)
G06F 3/0484 (2013.01)
G06T 15/00 (2011.01)

(52) U.S. Cl.
CPC .......... *G06T 19/20* (2013.01); *G06F 3/04842* (2013.01); *G06T 15/005* (2013.01);
(Continued)

(58) Field of Classification Search
None
See application file for complete search history.

(56) References Cited

U.S. PATENT DOCUMENTS 7,710,423 B2 * 5/2010 Drucker ............... G06T 11/206
  345/473
8,423,293 B2 * 4/2013 Kondo ................... G01C 21/36
  345/679

(Continued)

FOREIGN PATENT DOCUMENTS

KR 20140001152 A 1/2014
WO 2016077506 A1 5/2016

OTHER PUBLICATIONS

Ahn, Sangchul, "Webizing Virtual and Augmented Reality Content", Retrieved From https://web.archive.org/web/20171222112204/https:/www.w3.org/2016/06/vr-workshop/papers/letsee.html, Dec. 22, 2017, 3 Pages.

(Continued)

Primary Examiner — Andrew G Yang
(74) Attorney, Agent, or Firm — Liang IP, PLLC

(57) ABSTRACT

Computing devices for content library projection in computer-based 3D environments are disclosed herein. In one embodiment, a computing device is configured to provide, on a display, a user interface containing a work area having a template of a 3D environment and a gallery containing models of two-dimensional (2D) or 3D content items. The computing device can then detect, via the user interface, a user input selecting the content library to be inserted as an object into the template of the 3D environment. In response to detecting the user input, the computing device can render and surface on the display, graphical representations of the 2D or 3D content items corresponding to the models in the selected content library along a circle having a center spaced apart from a default position of a viewer of the 3D environment by a preset distance.

20 Claims, 11 Drawing Sheets

(52) U.S. Cl.
CPC ............... *G06T 2219/2004* (2013.01); *G06T 2219/2016* (2013.01)

(56) References Cited

U.S. PATENT DOCUMENTS

| | | | |
|---|---|---|---|
| 9,132,342 B2 | 9/2015 | Balachandreswaran et al. | |
| 9,536,251 B2 | 1/2017 | Huang et al. | |
| 9,728,010 B2 | 8/2017 | Thomas et al. | |
| 10,641,603 B2* | 5/2020 | Abovitz | G02B 2027/0138 |
| 2005/0229102 A1* | 10/2005 | Watson | G06F 3/0481 |
| | | | 715/739 |
| 2006/0218478 A1* | 9/2006 | Nonclercq | G06T 11/206 |
| | | | 715/206 |
| 2007/0234196 A1* | 10/2007 | Nicol | G06F 17/211 |
| | | | 715/205 |
| 2009/0138823 A1* | 5/2009 | Bradea | G06F 3/04817 |
| | | | 715/835 |
| 2010/0162175 A1* | 6/2010 | Lee | G06F 3/0482 |
| | | | 715/860 |
| 2010/0208033 A1 | 8/2010 | Edge et al. | |
| 2011/0310227 A1 | 12/2011 | Konertz et al. | |
| 2012/0030630 A1* | 2/2012 | Grossman | G06F 3/04815 |
| | | | 715/850 |
| 2013/0027426 A1* | 1/2013 | Sasaki | B60K 35/00 |
| | | | 345/629 |
| 2013/0181971 A1* | 7/2013 | Mueller | G06F 3/04815 |
| | | | 345/419 |
| 2014/0082032 A1 | 3/2014 | Leblond et al. | |
| 2014/0250412 A1* | 9/2014 | Vogelmeier | H04N 13/383 |
| | | | 715/852 |
| 2014/0267420 A1 | 9/2014 | Schowengerdt et al. | |
| 2014/0282220 A1 | 9/2014 | Wantland et al. | |
| 2015/0007082 A1* | 1/2015 | Fischer | G06F 3/04815 |
| | | | 715/771 |
| 2015/0356774 A1* | 12/2015 | Gal | G06F 17/50 |
| | | | 345/633 |
| 2016/0026253 A1 | 1/2016 | Bradski et al. | |
| 2017/0256096 A1* | 9/2017 | Faaborg | G06T 19/20 |
| 2018/0005456 A1* | 1/2018 | Vijayaraghavan | G06T 19/20 |
| 2019/0332182 A1* | 10/2019 | Shen | G06F 3/011 |
| 2019/0340829 A1* | 11/2019 | Marshall | G06T 19/20 |

OTHER PUBLICATIONS

"Instantiate prefabs in a circle or elipsoid—Unity Answers", Retrieved from: https://answers.unity.com/questions/28215/instantiate-prefabs-in-a-circle-or-elipsoid.html, Sep. 26, 2010, 4 Pages.

"International Search Report and Written Opinion Issued in PCT Application No. PCT/US19/029242", dated Aug. 20, 2019, 13 Pages.

Stemkoski, Lee, "Introduction to Unity, Part 1: Importing Assets and Scene Setup", Retrieved From: https://www.youtube.com/watch?v=VUhqrxcHoaE, Sep. 4, 2016, 1 Page.

\* cited by examiner

PROJECTION OF CONTENT LIBRARIES IN THREE-DIMENSIONAL ENVIRONMENT

BACKGROUND

In computing, a three-dimensional (3D) environment typically refers to a computer-based simulated 3D platform in which 3D representations of images, videos, sounds, or other digital content can be presented to viewers. 3D environments can provide a more immersive viewing experience than two-dimensional (2D) environments. However, authoring content in 3D environments remains challenging because of complexities in accurate representation and interaction control of objects in 3D environments. Due to such complexities, today, only a small group of authors possess necessary technical skills to create suitable content in 3D environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

3D environments can be particular suitable for presenting certain types of content to viewers because 3D environments can provide a more immersive viewing experience than two-dimensional (2D) environments. For example, 3D environments can be suitable for presenting training scenarios or product catalogs having 3D images, videos, sound recordings, etc. to viewers.

When authoring content in 3D environments, an author may import a content library containing multiple content items (e.g., 2D or 3D images of products) as objects in a 3D environment. However, authoring 3D environments incorporating content libraries can be challenging because of a whole range of authoring activities that are absent from authoring in 2D environments. For example, authoring activities such as 3D content placement and arrangement, 3D interaction with the placed content items, and motion specification of the 3D content items are absent from 2D authoring. In 2D authoring, when importing multiple objects into a 2D environment, the 2D objects can be arranged in a grid with rows and/or columns. In contrast, laying out the objects in a two-dimensional grid in a 3D environment may cause certain difficulties for viewers. For example, some objects in a 2D grid can cause occlusion in a 3D environment because one object can be partially or completely in front another object along a depth-dimension. The occlusion can cause the authored content to be obscured or confusing to a viewer. Even without occlusion, one- or two-dimensional arrangement of the objects in a 3D environment can render the objects to appear incoherent because apparent sizes of the objects can change with respect to a depth-dimension. As such, appearance uniformity or coherency of the objects can be lacking in the 3D environment when objects from a content library are presented as a grid.

In order to address the foregoing challenges, an author of 3D content typically needs to experiment with a large number of positions and arrangements of each object via trial and error to determine an optimal arrangement for the multiple objects in a 3D environment. Such experimentation can be labor intensive, inconsistent, and may not even produce a coherent placement and/or arrangement of the objects in the 3D environment. Imprecise placement and/or arrangement can detract user experience, or even induce headache, dizziness, or other negative physiological responses in a viewer when viewing content in the 3D environment.

Several embodiments of the disclosed technology can address at least some aspects of the foregoing challenges by automatically placing, arranging, and projecting supported 2D or 3D content items from an imported content library as objects arranged in a suitable geometric shape in a 3D environment taking into account of a combination of (i) a viewer's depth reception; (ii) the viewer's field of view; (iii) relative positions of one object relative to neighboring object in the 3D environment, and (iv) a field of view of AR/VR/MR headset. An environment data file can then be generated based on the automatically placed objects to create a file containing 3D content that can be distributed to other computing devices for reproducing the 3D environment.

In an example implementation, an authoring application can be configured to provide a template of a 3D environment having, for instance, a background (e.g., a blue sky), a scene (e.g., a mountain), a sound (e.g., sound of wind blowing), and one or more background objects (e.g., trees on the mountain). The template of the 3D environment can also comprise one or more anchor points at which content items (e.g., a 2D or 3D representation of car, bus, plane, etc.) from a content library can be automatically positioned within the 3D environment. The authoring application can also be configured to provide a facility for importing the content library and present available content libraries and corresponding content items as a gallery, a list, or in other suitable interface format.

Upon receiving a user input instructing the authoring application to import a content library into the 3D environment, the authoring application can be configured to import at least some of the content items in the content library as objects and automatically arrange the objects in a suitable geometric shape for a suitable viewing experience. In certain embodiments, the authoring application can be configured to initially resize (e.g., height, width, etc.) the content items from the content library based on a preset container size. For example, the preset container size can be a cube having a volume of about 1.0, 1.5, or 2.0 cubic meters. In other embodiments, objects representing the content items may be preprocessed to have the same or similar sizes before being imported into the 3D environment. Thus, the optional resizing by the authoring application may be omitted.

The authoring application can be configured to automatically determine a position and arrangement of the content items relative to a viewer in the 3D environment based on a preset distance from the viewer and presentation format. In one implementation, the multiple content items can be automatically arranged in the 3D environment along a planar circle or a portion of a circle (i.e., an arc) having a center that is spaced apart along a depth-dimension from the viewer at a preset distance along a field of view of the viewer. In one example, the preset distance between the center and the viewer can be about 5.0, 5.5, 6.0, 6.5 meters while the circle has a radius of about 2.0, 2.5, 3.0, or 3.5 meters. In other implementations, the content items may be arranged along an oval, a part of an oval, a triangle, a polygon, a grid, or other suitable geometric shapes and/or presentation formats.

The authorizing application can further be configured to determine a relative position of the objects along the circle or arc relative to one another in the 3D environment. In certain embodiments, the authoring application can utilize a cylindrical coordinate system to place the objects along the circle or arc. As such, each object can be identified by a polar coordinate along a polar axis (e.g., a depth dimension), a longitudinal coordinate along a longitudinal axis (e.g., a height dimension), and an angle coordinate relative to an origin of the coordinate system (e.g., the center of the circle or arc). In accordance with embodiments of the disclosed technology, the objects can be place at generally equal distance from the center of the circle or arc with a corresponding angle value of, e.g., about 10°, about 12.5°, about 15°, or other suitable values.

The inventors have recognized that such an arrangement of the objects may provide a suitable or even optimal viewing experience for the objects in the content library to the viewer. For example, when viewing the objects by the viewer, the object(s) closes to the viewer would appear larger than others due to the depth perception of the viewer. As such, the viewer can have a more detailed view of such objects than others in the content library. As discussed in more detail below, the viewer can then rotate, scroll, or pan the objects along the circle or arc such that other objects can be rotated to be closer to the viewer and appear larger to the viewer, and thus allowing for a more detailed view of the objects.

In certain embodiments, the authoring application can also be configured to place only a preset number of the content items as objects at a portion of the circle or arc closes to the viewer along the polar axis. Examples of the preset number can be 1, 2, 3, 4, 5, or other suitable numbers. Other than the preset number of objects closest to the viewer, the authoring application can be configured to present other objects as ellipses or other suitable symbols indicating that additional objects are available for viewing. In other embodiments, all of the content items may be presented along the circle or arc without using ellipses.

The authoring application can also be configured to import multiple content libraries and automatically arrange content items from the multiple content libraries as object groups in the 3D environment. The objects from different content libraries can be organized as object groups that are spaced apart in the 3D environment along, for example, a longitudinal axis (e.g., along a height dimension). As such, the 3D environment would present multiple object groups of objects in a stacked formation with each object group having objects arranged along a respective circle or arc. In other embodiments, the object groups can be arranged in the 3D environment in a staggered, interleaved, or other suitable formations.

The authorizing application can also be configured to impose certain behavioral characteristics to the objects arranged around the circle or arc when importing the content library. For example, the objects may be rotated along the circle or arc upon receiving a viewer's input for rotation, scrolling, panning, or other suitable input, using, for example, a laser pointer or other suitable 3D interaction device. In response, a viewing application of the 3D environment can be configured to modify relative positions of the objects of a content library in the 3D environment by presenting additional objects at positions closest or closer to the viewer via step-rotation, scrolling, or other suitable actions. The authoring application can also impart physical characteristics such as inertia to the objects such that scrolling of the objects may appear to slow down to a stop after a period of time.

As such, several embodiments of the disclosed technology can provide a user friendly authoring environment that allows an author to intelligently place supported 2D or 3D content items from a content library into the template of the 3D environment. By automatically positioning and arranging the objects in the 3D environment as described above, several embodiments of the disclosed technology can eliminate repetitive trial and error experimentations to determine the optimal placement and/or arrangements of the inserted objects of a content library, and thus improving productivity and user friendliness of creating 3D content that can provide an immersive experience to viewers.

DETAILED DESCRIPTION

Figure 1:
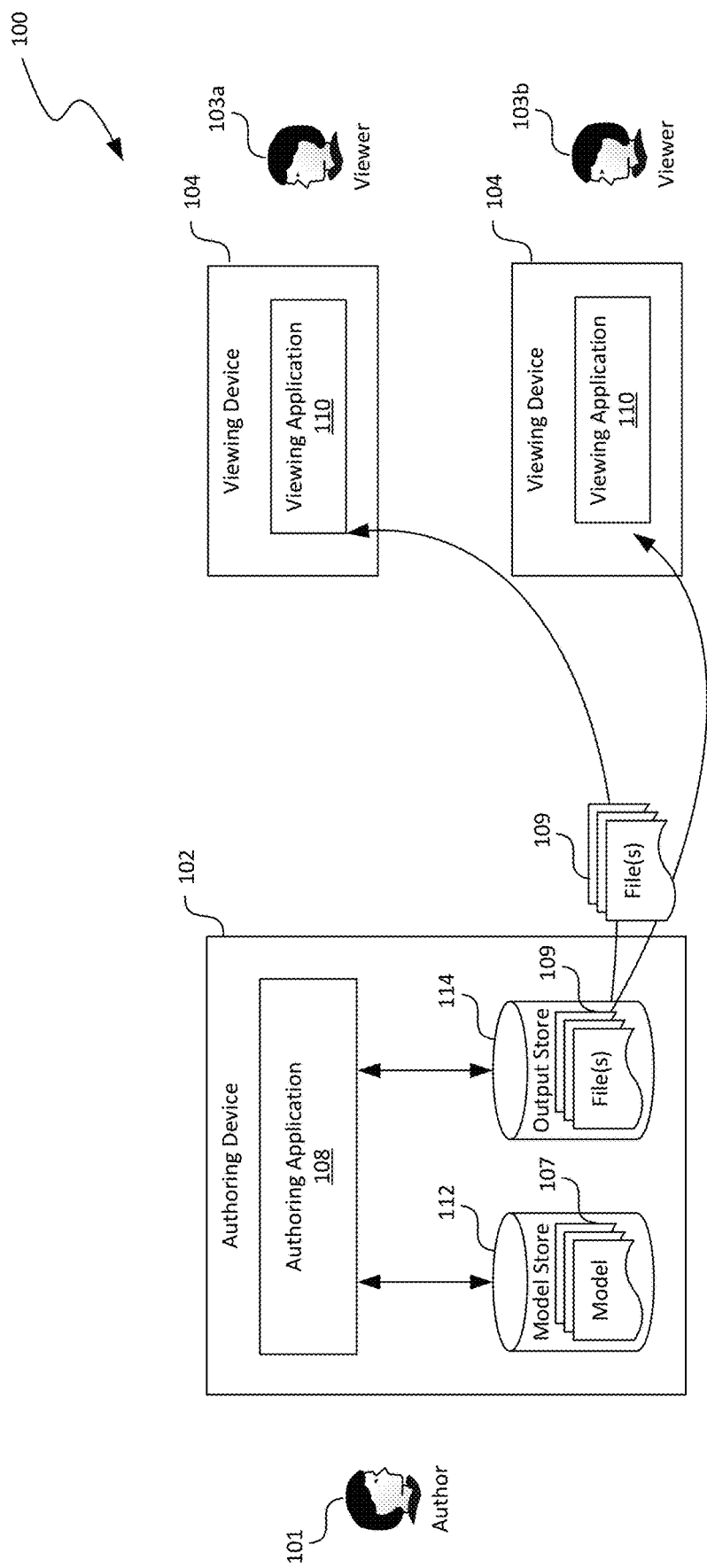
FIG. 1 is a schematic diagram illustrating a computing framework implementing content library projection in a 3D environment in accordance with embodiments of the disclosed technology.

Certain embodiments of systems, devices, components, modules, routines, data structures, and processes for content library projection in a 3D environment are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, a "three-dimensional environment" or "3D environment" generally refers to a computer-based simulated 3D platform in which two-dimensional (2D) or 3D representations of images, videos, sounds, or other digital content items can be presented to a viewer. A 3D environment can be a virtual space, such as a virtual reality (VR) world, or can be a real world space in which content can be displayed or layered on top of the real world, such as via augmented reality (AR) or other VR techniques.

Also used herein, the term "model" generally refers to data representing a 2D or 3D content item that can be rendered as an object in a 3D environment. Example models can include data representing a virtual room, a virtual scene, or any other subpart of a virtual world. Further used herein, the term "object" or "virtual object" generally refers to a visual representation of a 2D or 3D content item rendered in a 3D environment. Example objects can include 3D images, video recordings, etc. Further used herein, a "content library" generally refers to a file, file folder, list, or other suitable data structure containing data representing one or more models of respective content items that may or may not be rendered in a 3D environment. One example content library can include a file folder containing 2D or 3D images of products in a product catalog.

Aspects of the present disclosure are related to 3D environment authoring and generation using an authoring application. A 3D environment can contain one or more models individually include a virtual room, a virtual scene, or any other subpart of a virtual world. A user of the authoring application can graphically select a content library containing multiple 2D or 3D representations of models of content items and insert the selected representations into a 3D environment. As described in more detail below, a user can use an authoring application to select and insert models of content items in the content library into a 3D environment. In response, the authoring application can automatically determine placement and/or arrangement of the inserted content items and projecting the corresponding objects in the 3D environment such that a suitable view of the objects in the 3D environment is obtained. The 3D environment can then be stored as an environment data file containing information relating to the one or more models and/or content items in the 3D environment.

In certain embodiments, different types of content can be embedded or included in the 3D environment. Example content types can include 3D objects (e.g., 3D models, figures, shapes, etc.) or 2D objects (e.g., files, images, presentations, documents, web sites, videos, remote resources, etc.), etc. In other embodiments, a 3D environment can be a virtual space, such as a virtual reality (VR) world, or can be a real world space in which content can be displayed or layered on top of the real world, such as via augmented reality (AR) or other VR techniques. The 3D environment with the inserted models can then be stored as an environment data file later used to reproduce a 3D environment having 3D renderings of the inserted models.

Content authored in a 3D environment according to aspects disclosed herein can then be consumed using a viewing application on a viewing device such as a desktop computer or a smartphone. In one example, a 3D environment can be experienced across a wide spectrum of computing devices, ranging from low-end devices (e.g., GOOGLE CARDBOARD) to high-end devices (e.g., MICROSOFT HOLOLENS, OCULOUS RIFT, HTC VIVE, etc.). By using desktop or mobile computing devices to generate 3D environments, additional related overhead (e.g., the transmission of all required textures, light maps, audio files, etc.) can be avoided. Further, device-specific or platform-specific particularities can be handled by the viewing application, thereby making such particularities invisible to both the end-user and the author of the 3D environment.

The viewing application can comprise computing resources associated with the models used by the environment data file. In some examples, the environment data file can comprise computing resources for use when rendering the 3D environment or resources can be retrieved from a server or other remote location. When rendering the 3D environment, the viewing application can identify one or more anchor points when stitching adjacent or connected models specified by the environment data file together into a 3D environment. As an example, a model can comprise an entry anchor point and an exit anchor point. The entry anchor point can indicate a doorway or other entrance into the model, and the exit anchor point can indicate a doorway or other exit from the model. Thus, when stitching multiple models (e.g., adjacent or connected models) together, the exit anchor point of a first model can be used to position the entry anchor point of a second model (and, by extension, the second model), thereby creating a continuous combination of the models.

Authoring 3D environments incorporating content libraries containing multiple content items can be challenging because of a whole range of authoring activities that are absent from authoring in 2D environments. For example, in 2D authoring, when inserting multiple objects into a 2D environment, the inserted objects are typically arranged in a grid with rows and/or columns. In contrast, laying out the objects in a grid in a 3D environment may cause certain difficulties for viewers. For instance, some objects in the grid can cause occlusion in a 3D environment because one object can be partially or completely in front of another object along a depth-dimension. The occlusion can cause the authored content to be obscured or confusing to a viewer. Even without occlusion, one- or two-dimensional arrangement of the objects in a 3D environment can render the objects to appear incoherent because apparent sizes of the objects can change in relation to a distance from the viewer. As such, appearance uniformity or coherency of the objects can be lacking in the 3D environment when the objects are simply laid out as a 2D grid.

Several embodiments of the disclosed technology can address at least some aspects of the foregoing challenges by automatically placing, arranging, and projecting supported 2D or 3D content items imported from a content library as objects in a 3D environment taking into account of a combination of (i) a viewer's depth reception; (ii) the viewer's field of view; (iii) relative positions of one object relative to neighboring object in the 3D environment; and (iv) a field of view of an AR/VR/MR headset. An environment data file can then be generated based on the automatically placed objects to create a file containing 3D content that can be distributed to other computing devices for reproducing the 3D environment, as described in more detail below with reference to FIGS. 1-6.

FIG. 1 is a schematic diagram illustrating a computing framework 100 for content library projection in a 3D environment in accordance with embodiments of the disclosed technology. As shown in FIG. 1, the computing framework 100 can include an authoring devices 102 corresponding to an author 101 and one or more viewing devices 104 corresponding to viewers 103 (shown as first and second viewers 103a and 103b). The authoring device 102 and the viewing devices 104 can individually include a mobile computing device, a laptop, a tablet computer, a desktop computer, or other suitable types of computing device. Even though only one authoring device 101 and two viewing devices 103 are shown in FIG. 1 for illustration purposes, in other embodiments, the computing framework 100 can facilitate content authoring for additional authors 101 and/or viewers 103 with corresponding authoring and viewing devices (not shown). Example configurations of the authoring device 102 and the viewing devices 104 are described below in more detail with reference to FIG. 6.

As shown in FIG. 1, the authoring device 102 can include an authoring application 108, a model store 112 containing data records of models 107, and an output store 114 containing data records of 3D environment files 109. The authoring application 108 can be configured to provide the author 101 a user interface 130 (shown in FIG. 2A) representing a 3D environment to facilitate authoring content in a 3D environment. In certain embodiments, the authoring application 108 can be a web-based application accessible by the author 101 via a web browser. In other examples, the authoring application 108 can be an executable application, which can be retrieved and executed by a processor of the authoring device 102.

In one embodiment, the authoring application 108 can be configured to display 2D or 3D representations of one or more models 107 of content items of a content library as a gallery, list, or other suitable form. The author 101 can then select and insert the content library into the provided 3D environment as multiple objects corresponding to the content library. In other embodiments, the authoring application 108 can provide a variety of themes. Different models 107 or content library can be associated with one or more themes, or can be altered or adapted based on a selected theme (e.g., colors, textures, lighting, etc.). As described in more detail below with reference to FIGS. 2A-2F, the authoring application 108 can contain additional modules and routines configured to automatically projecting content items from a content library as objects in a 3D environment such that the author 101 can place all of the content items from the content library into the 3D environment without labor intensive trial and error experimentations.

The model store 112 can store one or more models 107 representing corresponding content items of one or more content libraries that can be used to author a 3D environment. In one example, models 107 or content libraries may be associated with one or more themes. When the author 101 selects a theme or content library, the authoring application 108 can provide one or more models 107 or content libraries associated with the selected theme. In some examples, a set of models 107 can be designed such that stitching a model 107 together with another model 107 from the same set can form a seemingly continuous model 107. In other examples, aspects of a model 107 stored in the model store 112 can be generated dynamically or programmatically. In certain embodiments, the author 101 can create the models 107 using the authoring application 108. In other embodiments, the models 107 can be retrieved from, for example, third party vendors of 2D or 3D content items, or from other suitable sources.

In certain embodiments, a model 107 may indicate that certain aspects may be substituted depending on another model 107 with which the original model 107 can be stitched. As an example, a first model 107 can indicate that a wall or archway may be replaced with a door. As such, an entry point of a second model may be stitched to the first model at the door. In other embodiments, other suitable replacement or model generation techniques may be used to generate the various models 107.

The authoring application 108 can also be configured to output an authored 3D environment as an environment data file 109 containing 3D environment data to, for example, the output store 114. In one implementation, the environment data file 109 can comprise information associated with selected models 107 (e.g., a model identifier, a model name, a model type, etc.), positioning information (e.g., coordinates, anchor point identifiers, etc.), content information (e.g., which content should be displayed for one or more anchor points, the content to be displayed, a reference to content, etc.), custom resources (e.g., custom textures, sounds, etc.), among other information. As shown in FIG. 1, the output store 114 can be configured to store one or more environment data files 109. As used herein, an "environment data file" can include a file on a file system, an entry in a database, or can be stored using any of a variety of other data storage techniques.

As shown in FIG. 1, the viewing devices 104 can each contain a viewing application 110 configured to generate, view, explore, and/or interact with a 3D environment based on an environment data file 109. In one example, viewing application 110 may be a web-based application accessible using a web browser. In other examples, the viewing application 110 can be an executable application for the viewing devices 104. In operation, the viewing application 110 can be configured to evaluate an environment data file 109 to identify one or more models 107 of a 3D environment. If an environment data file 109 references a plurality of models 107, the models 107 may be stitched together when rendering the 3D environment. The viewing application 110 can populate the rendered 3D environment with content based on the content specified by the environment data file 109. In one example, the viewing application 110 can use any of a variety of 3D rendering engines and can handle device- and/or engine-specific implementation details when rendering the 3D environment.

In certain embodiments, the viewing application 110 can be configured to retrieve an environment data file 109 from the output store 114, which, in conjunction with one or more models 107 from the model store 112, may be used to generate a 3D environment. In other embodiments in which the viewing application 110 is a locally-executed application, a model store 112 may be stored locally and/or remotely to the viewing device 104 executing the viewing application 110, and at least a part of an environment data file 109 may be retrieved from the output store 114. In further embodiments, the environment data file 109 may be streamed or retrieved in chunks from the output store 114 to the viewing devices 104.

Figure 2A:
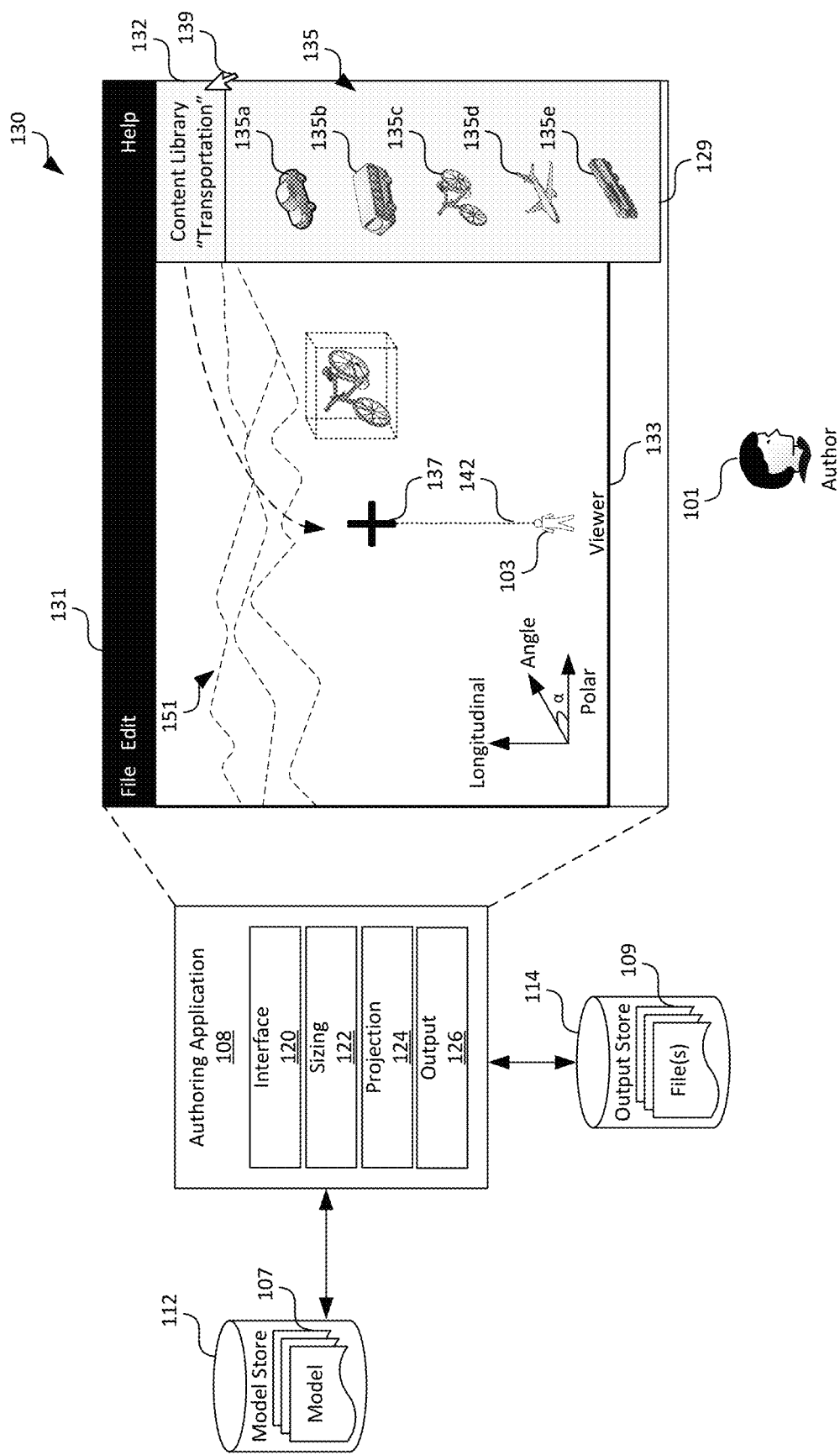
FIGS. 2A-2F are partially schematic diagrams illustrating certain hardware/software components of the computing framework of FIG. 1 in accordance with embodiments of the disclosed technology.

FIGS. 2A-2F are partially schematic diagrams illustrating certain hardware/software components of the computing framework 100 of FIG. 1 in accordance with embodiments of the disclosed technology. As shown in FIG. 2A, the authoring application 108 can include an interface component 120, a sizing component 122, a projection component 124, and an output component 126 operatively coupled to one another. Even though particular components are shown in FIG. 2A for illustration purposes, in other embodiments, the authoring application 108 can also include an input component or other suitable types of component.

In FIG. 2A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the interface component 120 of the authoring application 108 can be configured to provide a user interface 130 for facilitating the author 101 creating and/or modifying a 3D environment. In the illustrated example, the user interface 130 can include a menu bar 131 containing one or more menu groups such as "File," "Edit," and "Help." Each of the foregoing menu groups may be expanded for additional menu items such as "New," "Open," "Save," etc. In other examples, the menu bar 131 can include other suitable types of menu items.

As shown in FIG. 2A, the user interface 130 can also include a 3D working area 133 and a display area for content libraries 132 containing multiple content items or objects 135 available for importation. The 3D working area can be initially loaded with a template 151 of a 3D environment or with a previously saved 3D environment corresponding to an environment data file 109 in the output store 114. In the illustrated example, the 3D working area 133 is loaded with a template 151 of a 3D environment having a mountain, a sky, and an open ground in front of the mountain (shown in phantom lines for clarity). In other examples, the template 151 can include forest, buildings, or other suitable types of 3D environment. Also, as shown in FIG. 2A, only one content library 132 is shown for illustration purposes. In particular, the example content library 132 contains multiple objects 135 related to transportation, including, for instance, a car 135a, a bus 135b, a bicycle 135c, a plane 135d, and a train 135e. In other examples, objects 135 of additional content libraries 132 can also be presented in the display area 129.

The interface component 120 can also be configured to provide one or more anchor point 137 in the template 151 for placement of 2D or 3D objects from, for example, the content library 132. In FIG. 2A, the anchor point 137 is represented as a cross. In other embodiments, the anchor point 137 can also be represented as an arrow, star, or other suitable representations. In certain embodiments, the anchor point 137 can be designated by the author 101 by, for example, placing the anchor point 137 at an author selected location. In other embodiments, the anchor point 137 can be automatically determined by the interface component 120 at a location by the projection component 124 and provided in the 3D working area as one of multiple default anchor points 137. In further embodiments, the interface component 120 can allow the author 101 to place the anchor point 137 at locations within certain limited areas in the 3D environment.

As shown in FIG. 2A, the interface component 120 can also be configured to detect that the author 101 selects the content library 132 to be inserted into the 3D environment at the anchor point 137, via, for instance, drag and drop, as indicated by the dotted arrow and cursor 139. Optionally, the interface component 120 can then pass the detected user input to the sizing component 122 for determining whether the selected content library 132 contains object 135 that require resizing.

In one embodiment, the sizing component 122 can be configured to determine whether the objects 135 in the selected content library 132 requires resizing by fitting the objects 135 into a container of a preset size. For example, in a particular implementation, the sizing component 122 can be configured to fit the bicycle 135c into a cube having a one cubic meter volume. In other examples, the sizing component 122 can be configured to fit the objects 135 into a sphere, a cylinder, or other suitable shapes of volume with suitable sizes.

In response to determining that an object 135 (e.g., the bicycle 135c) exceeds the container in at least one dimension, the sizing component 122 can resize the object 135 so the object 135 just fits inside the container. On the other hand, when the object 135 is too small, for example, not having at least one dimension within 90%, 95%, or other suitable threshold of a corresponding dimension of the container, the sizing component 122 can also enlarge the object 135 to be sized just to fit into the container. Such resizing can thus render all objects 135 in the content library to be approximately the same size for optimal viewing in the 3D environment.

Upon completion of the foregoing sizing operations, the sizing component 122 can pass control to the projection component 124 for determining a position and arrangement for the inserted objects 135 from the content library 132. In accordance with embodiments of the disclosed technology, it has been recognized that placing the objects 135 in a Cartesian coordinate system in the 3D environment may not be convenient to provide a suitable view to the viewers 103 (FIG. 1). For example, if the objects 135 are arranged along one- or two-dimension along two orthogonal directions, some objects 135 may overlap with others to cause occlusion.

Figure 2B:
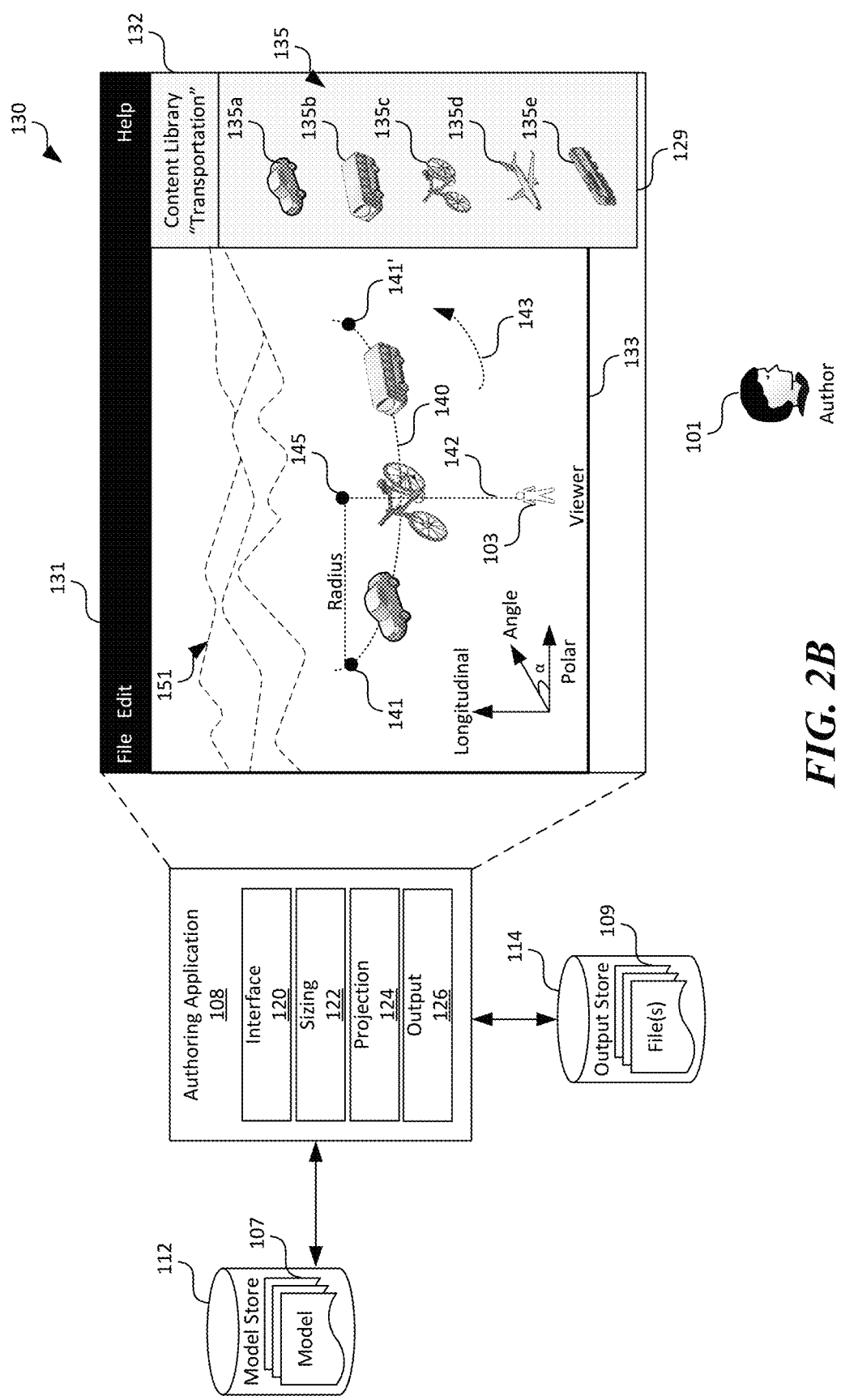

To address the foregoing challenge, several embodiments of the disclosed technology utilize a cylindrical coordinate system to place the objects 135 in the content library 132 along a circular arc 140 or circle relative to the position of the viewer 103. Such a placement arrangement can provide a suitable viewing experience to the viewer 103. For example, as shown in FIG. 2B, each object 135 can be identified by a polar coordinate along a polar axis, a longitudinal coordinate along a longitudinal axis, and an angle relative to an original of the cylindrical coordinate system. Example origins can be a default location of the viewer 102, the anchor point 137, a center 145 (FIG. 2B) of the circular arc 140 (FIG. 2B) or the circle 140' (FIG. 2E), or another suitable location in the 3D environment.

In one implementation, the projection component 124 can be configured to determine a line of sight 142 for the viewer 103 from a default position of the viewer 103. Upon obtaining a direction of the line of sight 142, the projection component 124 can be configured to determine a circular arc 140 or a circle 140' having a center 145 that is spaced apart from the default position of the viewer 103 by a preset distance. For instance, the preset distance between the center 145 and the viewer can be about 5.0, 5.5, 6.0, 6.5 meters while the circular arc 140 has a radius of about 2.0, 2.5, 3.0, or 3.5 meters. In FIGS. 2A-2D, the circular arc 140 and circle 140" are shown as dashed lines for illustration purposes. The circular arc 140 and circle 140' are not visually presented in the 3D environment to viewers, but instead the placement of the objects 135 forms the circular arc 140 or the circle 140'.

As shown in FIG. 2B, the projection component 124 can then be configured to place the objects 135 along the circular arc 140 having a preset radius. In the illustrated example, the projection component 124 is configured to place only a preset number (i.e., the car 135a, the bicycle 135c, and the bus 135b) of the objects 135 at a portion of the circular arc 140 closes to the viewer 103. Other examples of the preset number can be 1, 2, 4, 5, or other suitable numbers. Other than the preset number of objects 135 closest to the viewer 103, the projection component 124 can be configured to present ellipsis 141 and 141' or other suitable symbols indicating that additional objects 135 are available for viewing. Thus, when viewing the objects 135 by the viewer 103, the object 135 (e.g., the bicycle 135c) closes to the viewer 103 would appear larger than others due to the depth perception of the viewer 103. As discussed in more detail below, the viewer 103 can also rotate, scroll, or pan the objects such that other objects 135 can appear larger to the viewer 103 for a more detailed view of the objects 135. In other embodiments, all of the content items may be presented as objects 135 along the circular arc 140 or circle 140' without using ellipsis, as described in more detail below with reference to FIG. 2E.

The projection component 124 can further be configured to determine a relative position of the objects 135 along the circular arc 140 relative to other objects 135 in the 3D environment. In the illustrated example, the objects 135 can each be place at generally an equal distance (e.g., the radius) from the center 145 of the circular arc 140 with a corresponding angle separation from a neighboring object 135 of, e.g., about 10°, about 12.5°, about 15°, or other suitable angle separations. The inventors have recognized that such a placement arrangement of the objects 135 may provide a suitable or even optimal viewing experience for the objects 135 in the content library 132 to the viewer 103.

Figure 2C:
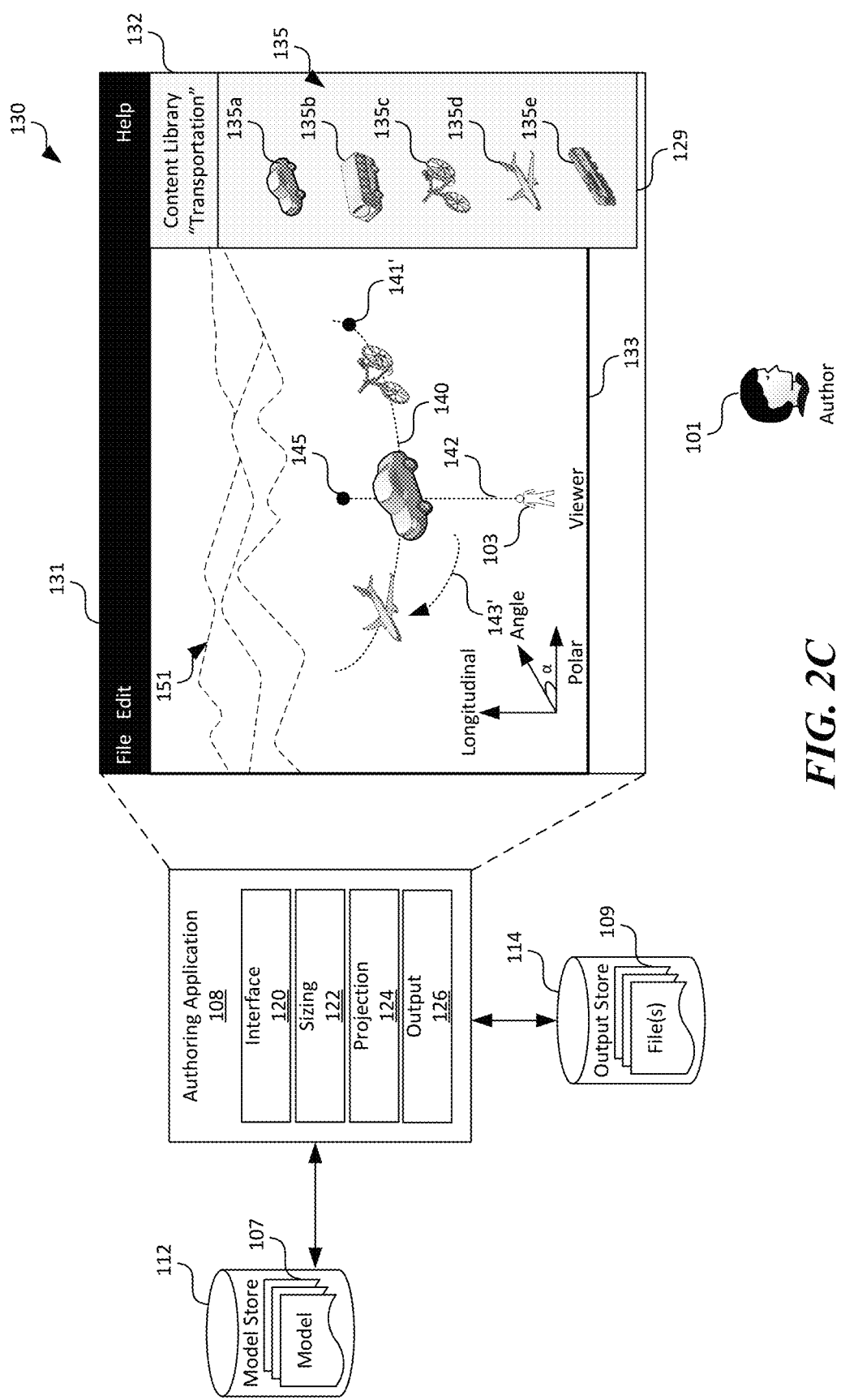
Figure 2D:
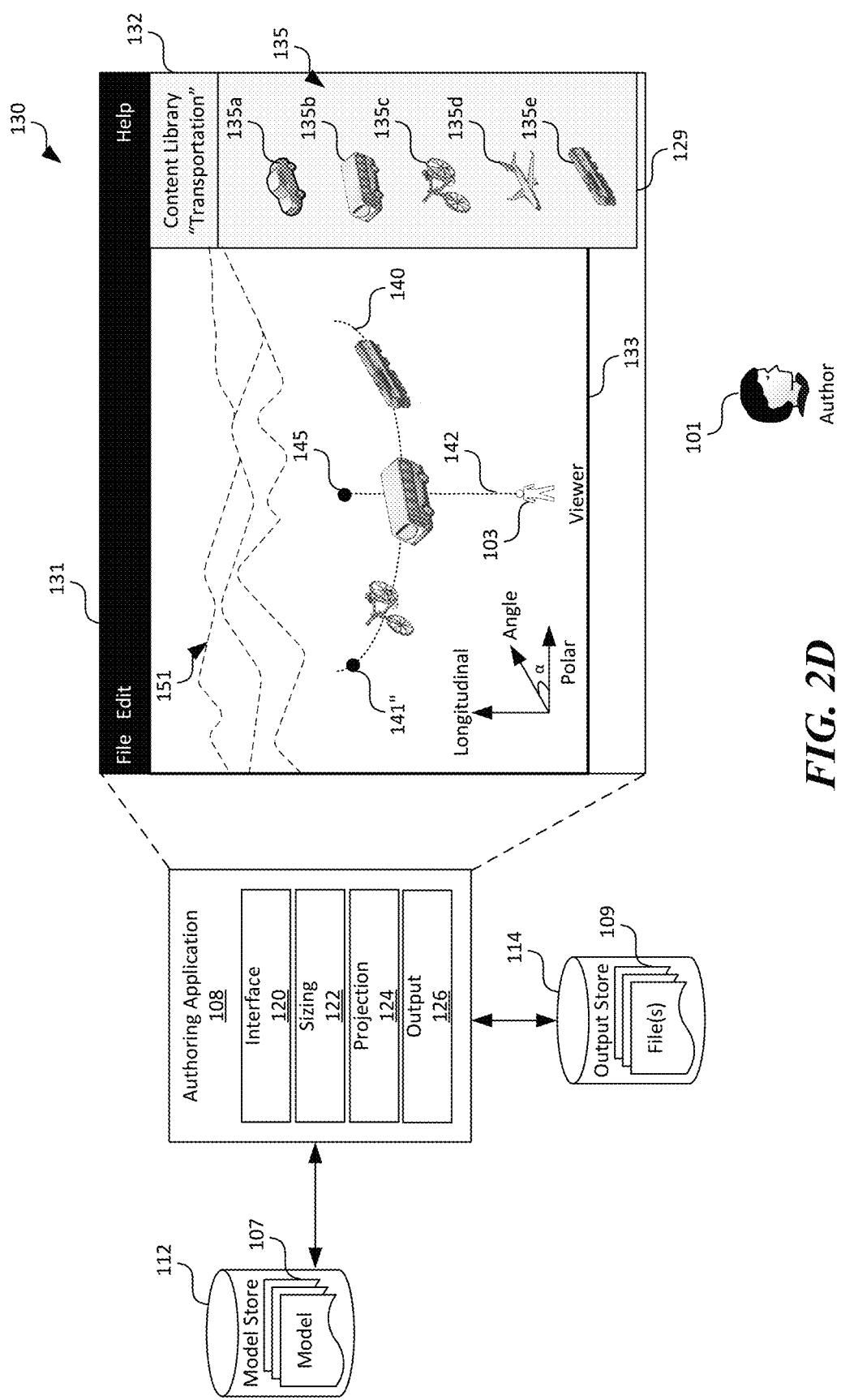

The projection component 124 can also be configured to impose certain behavioral characteristics to the objects 135 arranged around the circular arc 140. For example, the objects 135 may be repositioned along the circular arc 140 upon receiving a viewer's input for rotation, scrolling, panning, or other suitable input, using, for example, a laser pointer. In response, relative positions of the objects 135 in the 3D environment by presenting additional objects 135 at positions closest or closer to the viewer 103. For example, as shown in FIG. 2B, a viewer 103 may provide a user input 143 for scrolling the objects 135 in a counter-clockwise direction. In response, as shown in FIG. 2C, the car 135a can be rotated to a position closes to the viewer 103 while the plan 135d is now shown as an image instead of an ellipsis 141. The bus 135b is now shown as another ellipsis 141'. In another example, as shown in FIG. 2C, the viewer 103 can also provide another user input 143' for scrolling the objects 135 in a clockwise direction. In response, as shown in FIG. 2D, the bus 135b can be rotated to a position closes to the viewer 103 while the train 135e is now shown as an image instead of an ellipsis 141'. The car 135a is now shown as another ellipsis 141". In other embodiments, the authoring application can also impart physical characteristics such as inertia to the objects such that rotating or scrolling of the objects may appear to slow down after a period of time.

Even though the objects 135 of the content library 132 are shown as automatically placed along a circular arc 140 in a particular sequence, in other embodiments, the projection component 124 can also be configured to allow the author 101 to change a relatively position of an object 135 relative to other objects 135. For example, the author 101 may change the sequence shown in FIG. 2D from bicycle 135c, bus 135a, and train 135e to bus 135a, bicycle 135c, and the train 135e. During such a change, relative angle separation between neighboring objects 135 can still be maintained.

Figure 2E:
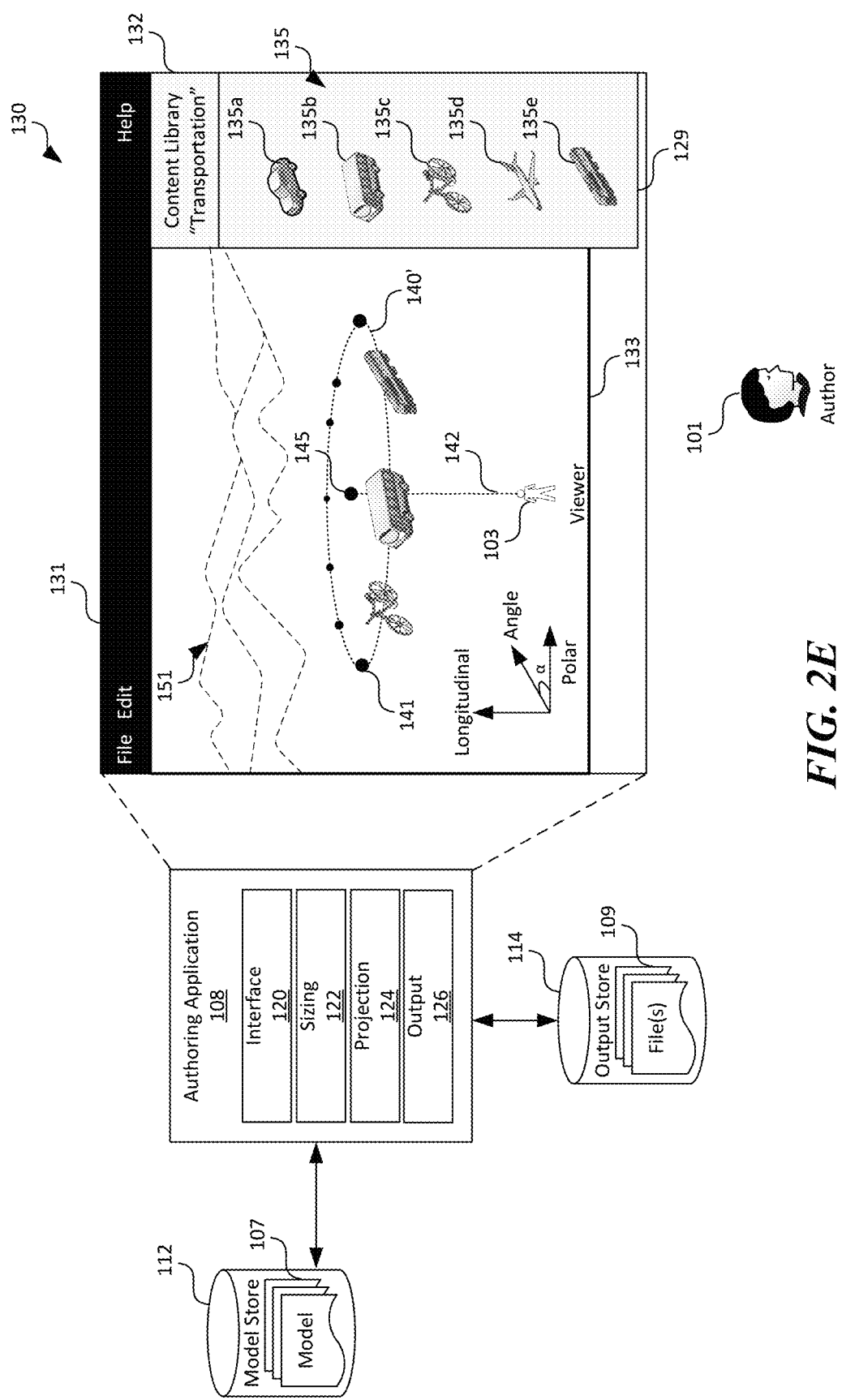

In further embodiments, the projection component 124 can also be configured to automatically place the objects 135 along a circle, an oval, or other suitable shapes in the 3D environment. For example, as shown in FIG. 2E, the objects 135 in the content library 132 are placed along a circle 140 having the center 145 spaced apart from the viewer 103 by the preset distance. In the illustrated embodiment, not all of the objects 135 are shown as images but instead some are shown as ellipsis 141. In other embodiments, all of the objects 135 may be shown as images along the circle 140' as long as a threshold angle separation (e.g., 15°) between neighboring objects 135 are maintained.

Figure 2F:
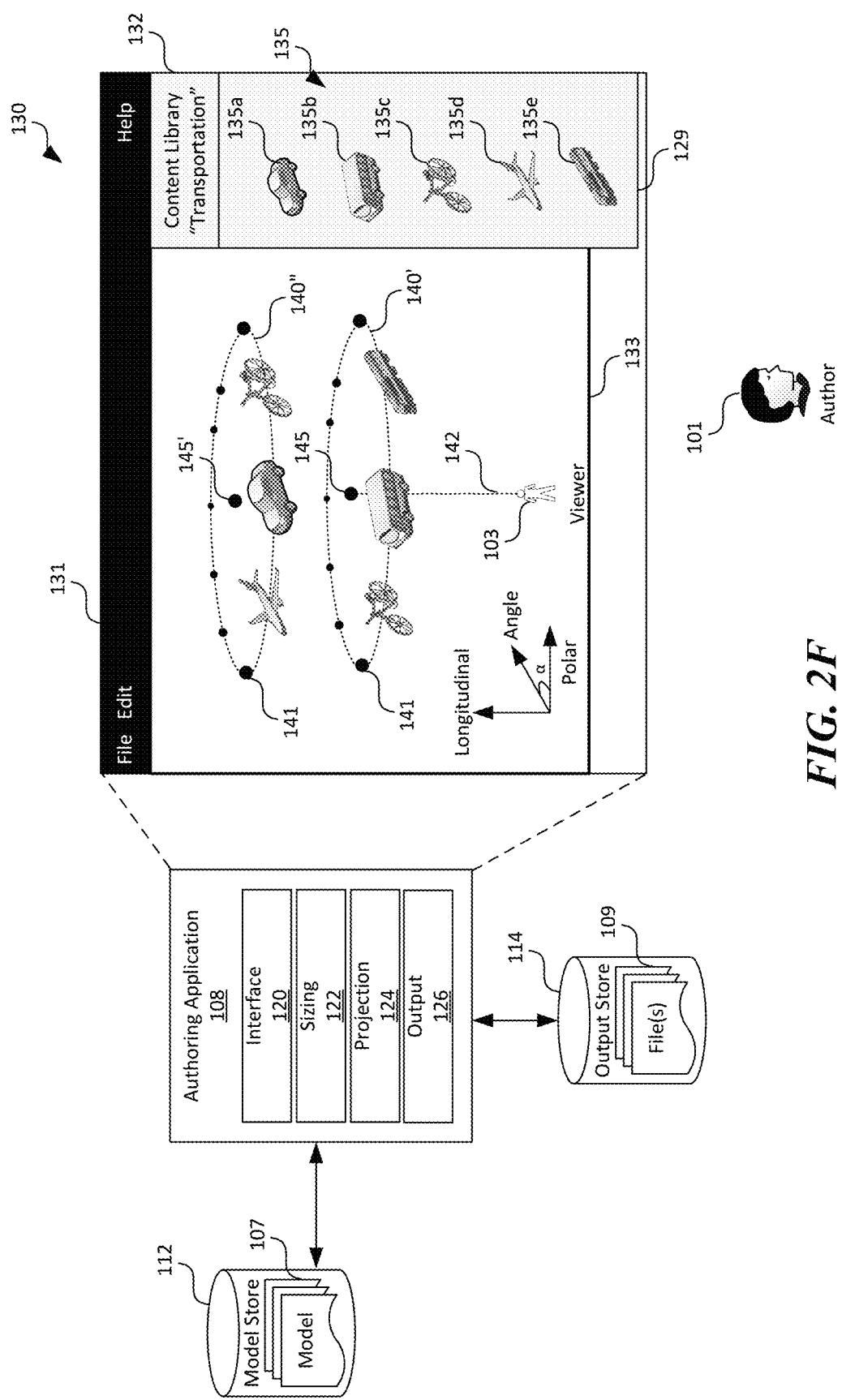

In further embodiments, the projection component 124 can be configured to import and automatically arrange content items from additional content libraries 132 (not shown) as objects 135 in the 3D environment. The objects 135 from different content libraries can be organized as groups that are spaced apart in the 3D environment along, for example, a longitudinal axis. As such, the 3D environment would present multiple groups of objects 135 in a stacked formation with each group having objects arranged along a corresponding circle 140' or circular arc 140 at a corresponding plane, as shown in FIG. 2F. In other embodiments, the groups can be arranged in the 3D environment along the polar axis or in other suitable formations.

When the author 101 finishes inserting objects 135 and/or content libraries 132 into the 3D environment, the output component 126 can be configured to generate an environment data file 109 to be stored in the output store 126. The environment data file 210 can contain data representing the template 151 of the 3D environment as well as an identity, position, size, relative location, or other suitable information of the objects inserted into the template 151.

Figure 3A:
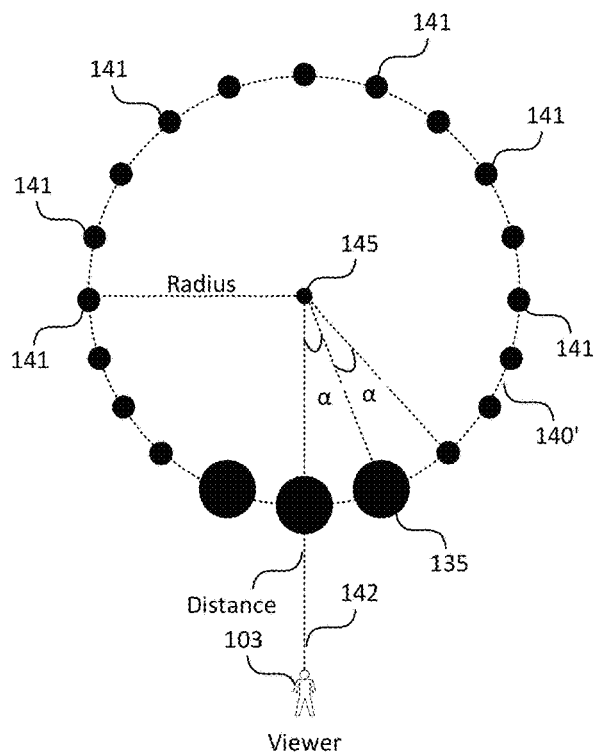
FIGS. 3A and 3B are schematic top views illustrating certain positional arrangements of content library projection in a 3D environment in accordance with embodiments of the disclosed technology.
Figure 3B:
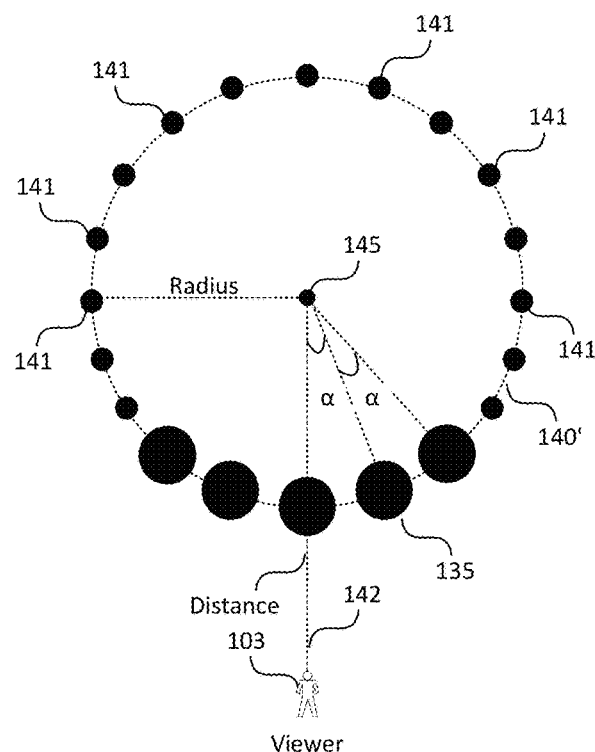

FIGS. 3A and 3B are schematic top views illustrating certain positional arrangements in a 3D environment during certain stages of operation in accordance with embodiments of the disclosed technology. As shown in FIG. 3A, the various objects 135 from a content library 132 (FIG. 2A) can be represented along a circle 140' in a cylindrical coordinate system in which each object 135 has a preset angle separation (e.g., 15°) from a neighbor and a radius (e.g., 2.5 meters) relative to the center 145 that is spaced apart from a position of the viewer 103 along a light of sight 142 of the viewer 103. In the illustrated example, three objects 135 closest to the viewer 103 are represented as actual images (or other suitable content types) while the other objects 135 are represented as ellipsis 141. In another examples, as shown in FIG. 3B, five objects 135 closest to the viewer 103 are represented as actual images (or other suitable content types) while the other objects 135 are represented as ellipsis 141. In further examples, all of the objects 135 may be represented as actual images (or other suitable content types) along the circle 140'.

Figure 4A:
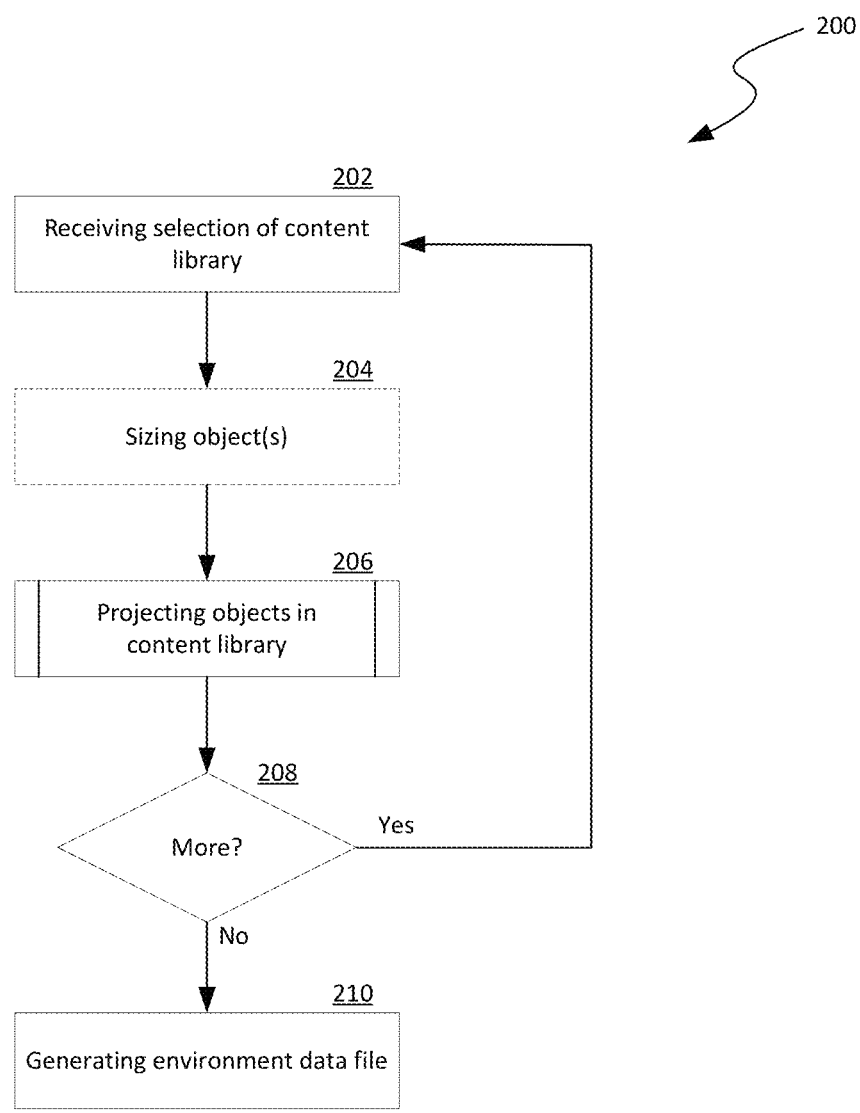
FIGS. 4A-5 are flowcharts illustrating certain processes of content library projection in a 3D environment in accordance with embodiments of the disclosed technology.
Figure 4B:
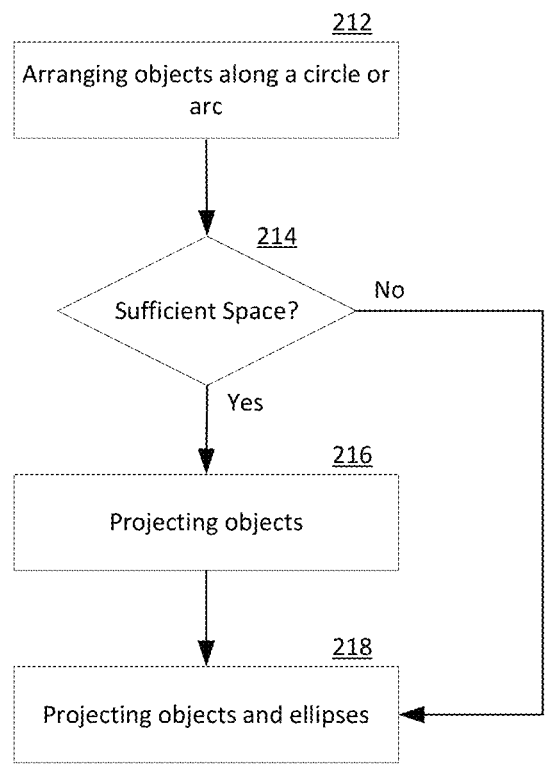
Figure 5:
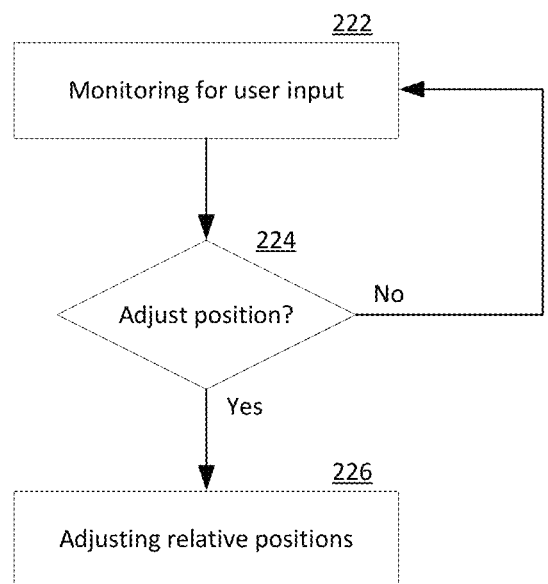

FIGS. 4A-5 are flowcharts illustrating certain processes of content library projection in a 3D environment in accordance with embodiments of the disclosed technology. Even though the processes are described below with reference to the computing framework 100 of FIGS. 1-2E, in other embodiments, the processes can be implemented in computing frameworks with additional and/or different components.

As shown in FIG. 4A, a process 200 of projection of content library in a 3D environment includes receiving a selection of a content library having multiple models each corresponding to a content item to be placed as an object in the 3D environment at stage 202. In one embodiment, the selection can be received by detecting that an author 101 (FIG. 2A) dragged and dropped a graphic representation of the content library into the 3D environment, as shown in FIG. 2A. In other embodiments, the selection can be received by detecting an insert command, a copy/paste command, and/or other suitable commands.

Upon receiving the selection of the content library, the process 200 can optionally include sizing one or more virtual objects described by the models in the content library at stage 204. In certain embodiments, sizing the virtual objects can initially include determining whether the object requires resizing, for example, by using a container shown in FIG. 2A. In response to determining that resizing is needed, the virtual object can be resized, for example, proportionally along three dimensions such that the object is not too large or small when compared to the container. In other embodiments, sizing the virtual objects can include modifying at least one dimension of the objects based on a preset value without determining whether the object requires resizing. In further embodiments, sizing the virtual objects can be omitted from the process 200.

The process 200 can then include projecting the objects from the content library in the 3D environment at stage 206. In certain embodiments, the objects can be positioned in the 3D environment based on a cylindrical coordinate system and along a circle, circular arc, or oval. Each object can be placed according to an azimuth, a radial distance, and a height. For example, a center 145 (FIG. 2B) can be an origin of the coordinate system, and the objects placed along a circle can each have a different azimuth, but the same radial distance and height. In particular, an object closest to the viewer 103 in FIG. 2B can have an example coordinate of (0°, 3 meters, 0 meter), corresponding to a location that is 3 meters away from the viewer 103 along the line of sight 142 of the viewer 103. In other embodiments, the objects can be placed in the 3D environment based on a Cartesian coordinate system, a spherical coordinate system, or other suitable types of coordinate system. Example operations of projecting the objects are described in more detail below with reference to FIG. 5B.

The process 200 can then include a decision stage 208 to determine whether additional content libraries are selected. In response to determining that an additional content library is selected for insertion, the process 200 revers to receiving the selection at stage 202; otherwise, the process 200 proceeds to generating an environment data file containing data representing the projected content library in the 3D environment at stage 210, as described in more detail above with reference to FIG. 1.

FIG. 4B illustrates example operations for projecting a content library in a 3D environment. As shown in FIG. 4B, the operations can include arranging objects from a content library along a circle or circular arc at stage 212. In certain embodiments, the objects are spaced apart from one another by a preset angle separation, e.g., 10°, 15°, or 20°. In other embodiments, the objects can be spaced apart by relative distance or other suitable parameters. The operations can then include a decision stage to determine whether sufficient spaces are available to accommodate all of the objects in the content library based on, for example, the preset angle separation. In response to determining that sufficient spaces are available along the circle or circular arc, the operations can include projecting the objects as images, videos, or other suitable types of content items along the circle or circular arc at stage 216. In response to determining that sufficient spaces are not available along the circle or circular arc, the operations can include projecting the some objects as images, videos, or other suitable types of content items along a portion of the circle or circular arc while projecting ellipsis representing other objects along another portion of the circle or circular arc at stage 218.

FIG. 5 illustrates example operations for manipulating positions of objects of a projected content item in a 3D environment. As shown in FIG. 5, the operations can include monitoring for a user input for rotating, scrolling, panning, or other suitable types of navigational operation. The operations can then include a decision stage 224 to determine whether position of the objects should be adjusted based on a monitored user input. In response to determining that positions of the objects are to be adjusted, the operations can include adjusting relative positions at stage 226 by, for example, shifting angle offset relative to an origin as shown in FIGS. 2B-2D.

Figure 6:
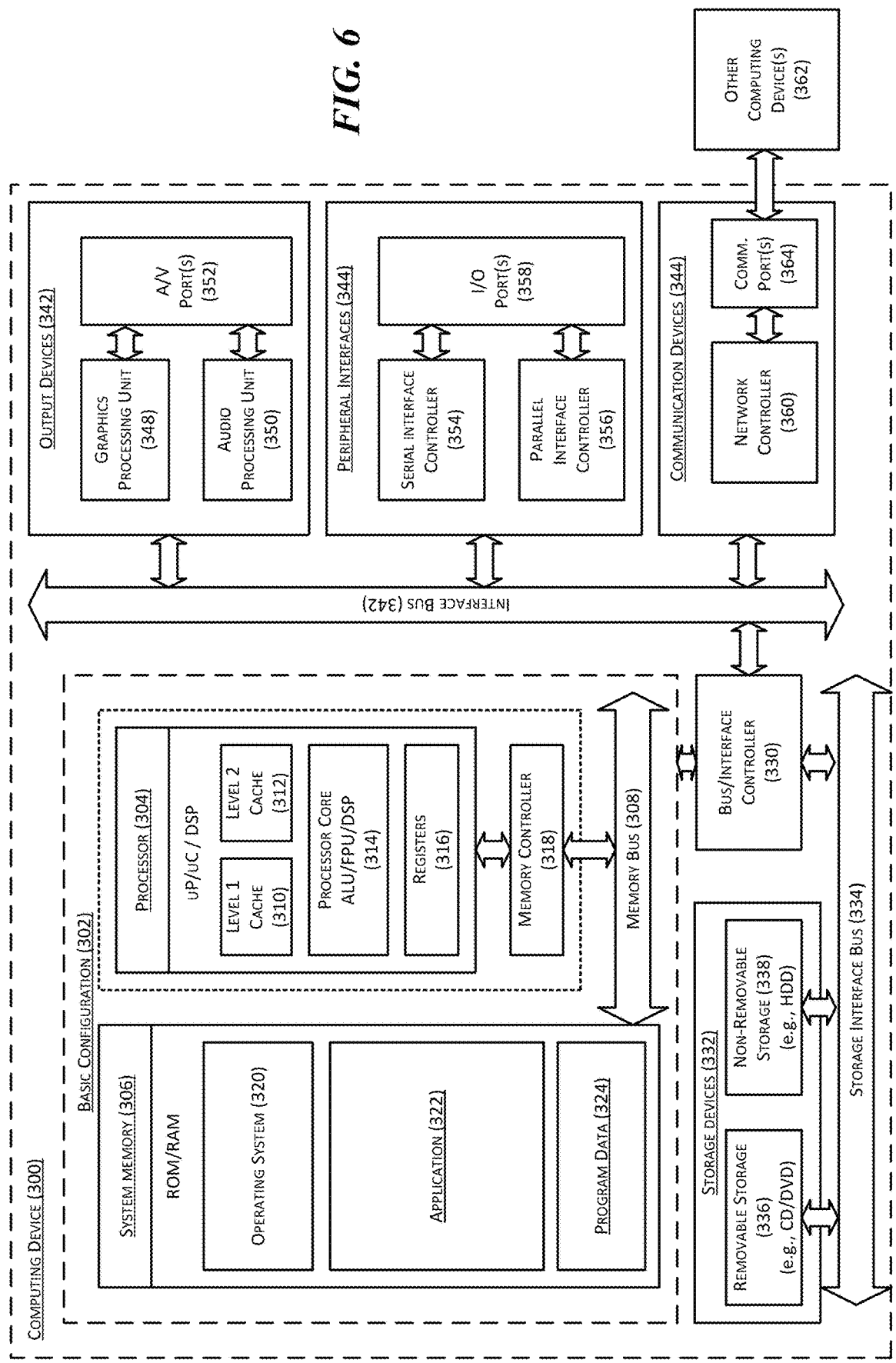
FIG. 6 is a computing device suitable for certain components of the computing framework in FIG. 1.

FIG. 6 is a computing device 300 suitable for certain components of the computing framework 100 in FIG. 1. For example, the computing device 300 can be suitable for the authoring device 102 or the viewing devices 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of projecting a content library of objects in a computer-based three-dimensional (3D) environment when authoring content using a computing device having a display and processor, the method comprising:
   with the processor of the computing device,
      providing, on the display of a computing device, a template of a 3D environment having a background;
      receiving, a user input selecting a content library containing multiple models individually representing a two-dimensional (2D) or 3D content item to be inserted as an object into the template of the 3D environment; and
   in response to receiving the user input selecting the content library,
      automatically determining a location to place the individual objects along at least a portion of a circle that is planar with respect to depth and longitudinal dimensions, at an elevation along a height dimension in the 3D environment, and is coplanar to a line of sight of a viewer of the individual objects in the 3D environment, the at least a portion of the circle having a center at the elevation along the height dimension and spaced apart from the viewer at a preset distance along the line of sight of the viewer of the 3D environment in the depth dimension; and
      rendering and placing a graphical representation of the individual 2D or 3D content items as the objects at the determined locations along the at least a portion of the circle in the 3D environment such that one of the objects closest to the viewer would appear larger than others in the 3D environment due to a depth perception of the viewer.

2. The method of claim 1 wherein automatically determining the location includes:
   automatically determining a location to place the individual objects along the at least a portion of the circle having (i) a center at a preset distance from and along a line of sight of a viewer of the 3D environment and (ii) a preset radius.

3. The method of claim 1 wherein automatically determining the location includes:
   automatically determining a location to place the individual objects along the at least a portion of the circle and being separated from a neighboring object by a preset angle relative to a center of the at least a portion of the circle.

4. The method of claim 1 wherein automatically determining the location includes:
   automatically determining a location to place the individual objects along the at least a portion of the circle and being separated from a neighboring object by a preset angle relative to a center of the at least a portion of the circle;
   determining whether sufficient space around the at least a portion of the circle exists to accommodate the objects in the content library; and
   in response to determining that sufficient space around the at least a portion of the circle exists to accommodate the objects in the content library, rendering and placing a graphical representation of the individual 2D or 3D content items as the objects at the determined locations along the at least a portion of the circle in the 3D environment.

5. The method of claim 1 wherein automatically determining the location includes:
   automatically determining a location to place the individual objects along the at least a portion of the circle and being separated from a neighboring object by a preset angle relative to a center of the at least a portion of the circle;
   determining whether sufficient space around the at least a portion of the circle exists to accommodate the objects in the content library; and in response to determining that sufficient space around the at least a portion of the circle does not exist to accommodate the objects in the content library,
rendering and placing a graphical representation of a preset number of the 2D or 3D content items as the objects at the determined locations along the at least a portion of the circle in the 3D environment; and
rendering and placing a graphical representation of an ellipsis as the individual remaining objects at the determined locations along the at least a portion of the circle in the 3D environment.

6. The method of claim 1, further comprising:
imparting behavioral characteristics to the rendered and placed graphical representation of the individual 2D or 3D content items along the at least a portion of the circle in the 3D environment, the behavioral characteristics including scrolling or panning of the rendered objects along the at least a portion of the circle.

7. The method of claim 1 wherein rendering and placing the graphical representation includes:
rendering and placing a graphical representation of one of the 2D or 3D content items as an object closest to the viewer along the line of sight of the viewer in the 3D environment.

8. The method of claim 1 wherein rendering and placing the graphical representation includes:
rendering and placing the graphical representations of the 2D or 3D content items as objects of a group in the 3D environment; and
the method further includes:
receiving, another user input selecting another content library containing multiple models individually representing a 2D or 3D content item to be inserted as an object into the template of the 3D environment; and
rendering and placing a graphical representation of the individual 2D or 3D content items of the another content library as the objects of another group along at least a portion of another circle in the 3D environment.

9. The method of claim 1 wherein rendering and placing the graphical representation includes:
rendering and placing a graphical representation of one of the 2D or 3D content items as objects of a group in the 3D environment; and
the method further includes:
receiving, another user input selecting another content library containing multiple models individually representing a 2D or 3D content item to be inserted as an object into the template of the 3D environment; and
rendering and placing a graphical representation of the individual 2D or 3D content items of the another content library as the objects of another group along at least a portion of another circle in the 3D environment, wherein the group arranged along the at least a portion of the circle and the another group arranged along the at least a portion of the another circle are in a stacked formation relative to each other.

10. A computing device, comprising:
a processor;
a display; and
a memory operatively coupled to the processor and the display, the memory containing instructions executable by the processor to cause the computing device to:
provide, on the display, a user interface containing a work area having a template of a 3D environment and a gallery containing a content library having multiple models of two-dimensional (2D) or 3D content items;
detect, via the user interface, a user input selecting the content library to be inserted as an object into the template of the 3D environment; and
in response to detecting the user input selecting the content library, render and surface, on the display, graphical representations of the 2D or 3D content items corresponding to the models in the selected content library along a circle that is planar with respect to depth and longitudinal dimensions, at an elevation along a height dimension in the 3D environment, and is coplanar to a line of sight of a viewer of the individual objects in the 3D environment, the circle having a center at the elevation along the height dimension and spaced apart from the viewer of the 3D environment by a preset distance along the line of sight of the viewer in the depth dimension such that one of the objects closest to the viewer would appear larger than others in the 3D environment due to a depth perception of the viewer.

11. The computing device of claim 10 wherein to render and surface the graphical representations includes:
to render and surface, on the display, graphical representations of the 2D or 3D content items corresponding to the models in the selected content library along a circle having a center spaced apart from a default position of a viewer of the 3D environment by a preset distance and having a preset radius.

12. The computing device of claim 10 wherein to render and surface the graphical representations includes:
to render and surface, on the display, graphical representations of the 2D or 3D content items corresponding to the models in the selected content library along a circle having a center spaced apart from a default position of a viewer of the 3D environment by a preset distance and having a preset radius, wherein pairs of neighboring rendered graphical representations are separated from each other by a preset angle relative to the center of the circle.

13. The computing device of claim 10 wherein to render and surface the graphical representations includes:
to render and surface, on the display, graphical representations of one or more of the 2D or 3D content items corresponding to the models in the selected content library along a portion of the circle that is closest to the viewer in the 3D environment; and
to render and surface, on the display, graphical representation of remaining 2D or 3D content items corresponding to the models in the selected content library as ellipses along another portion of the circle.

14. The computing device of claim 10 wherein the memory contains additional instructions executable by the processor to cause the computing device to:
impart behavioral characteristics to the rendered and placed graphical representation of the individual 2D or 3D content items along the at least a portion of the circle in the 3D environment, the behavioral characteristics including scrolling or panning of the rendered objects along the circle.

15. The computing device of claim 10 wherein to render and surface the graphical representations includes:

to render and place the graphical representations of the 2D or 3D content items as objects of a group in the 3D environment; and the memory contains additional instructions executable by the processor to cause the computing device to render and place graphical representations of 2D or 3D content items of another content library as additional objects of another group along another circle in the 3D environment.

16. The computing device of claim 10 wherein to render and surface the graphical representations includes:

to render and place the graphical representations of the 2D or 3D content items as objects of a group in the 3D environment; and the memory contains additional instructions executable by the processor to cause the computing device to render and place graphical representations of 2D or 3D content items of another content library as additional objects of another group along another circle in the 3D environment, wherein the group arranged along the circle and the another group arranged along the another circle are in a stacked formation relative to each other.

17. A method of projecting a content library of objects in a computer-based three-dimensional (3D) environment when authoring content using a computing device having a display and processor, the method comprising:

with the processor of the computing device, providing, on the display, a user interface containing a work area having a template of a 3D environment and a gallery containing one or more content libraries each having multiple models of two-dimensional (2D) or 3D content items;

receiving, via the user interface, a user input selecting one of the content libraries from the gallery to be inserted into the template of the 3D environment; and in response to receiving the user input selecting the content library, rendering and surfacing, on the display, graphical representations of the respective 2D or 3D content items corresponding to the models in the selected content library along an arc that is planar with respect to depth and longitudinal dimensions, at an elevation along a height dimension in the 3D environment, and is coplanar to a line of sight of a viewer of the individual objects in the 3D environment, the arc having a center at the elevation along the height dimension and spaced apart from the viewer of the 3D environment along the line of sight of the viewer in the depth dimension by a preset distance such that one of the objects closest to the viewer would appear larger than others in the 3D environment due to a depth perception of the viewer.

18. The method of claim 17 wherein:

the geometric shape includes at least a portion of a circle; and rendering and surfacing includes rendering and surfacing the individual objects along the circle having (i) a center at a preset distance from and along a line of sight of the viewer of the 3D environment and (ii) a preset radius.

19. The method of claim 17 wherein:

the geometric shape includes at least a portion of a circle; and rendering and surfacing includes automatically determining a location to place the individual objects along the at least a portion of the circle and being separated from a neighboring object by a preset angle relative to a center of the at least a portion of the circle.

20. The method of claim 17 wherein the geometric shape includes at least a portion of a circle, and wherein rendering and surfacing the graphical representations includes:

automatically determining a location to place the individual objects along the at least a portion of the circle and being separated from a neighboring object by a preset angle relative to a center of the circle;

determining whether sufficient space around the circle exists to accommodate the objects in the selected content library; and in response to determining that sufficient space around the circle does not exist to accommodate the objects in the content library, rendering and placing a graphical representation of a preset number of the 2D or 3D content items as the objects along a portion of the circle in the 3D environment; and rendering and placing a graphical representation of an ellipsis as the individual remaining objects along the at least a portion of the circle in the 3D environment.

* * * * *